United States Patent [19]

Johnson

[11] Patent Number: 4,810,436
[45] Date of Patent: Mar. 7, 1989

[54] PROCESS FOR THE FORMATION OF BORON-CONTAINING CERAMICS FROM ORGANOBORON PRECERAMIC POLYMERS

[75] Inventor: Robert E. Johnson, Hoboken, N.J.

[73] Assignee: Hoechst Celanese Corp., Somerville, N.J.

[21] Appl. No.: 96,186

[22] Filed: Sep. 14, 1987

Related U.S. Application Data

[63] Continuation-in-part of Ser. No. 933,413, Nov. 21, 1986, abandoned.

[51] Int. Cl.$^4$ ............................................. D01F 9/08
[52] U.S. Cl. .................... 264/29.1; 264/29.2; 264/29.6; 264/56; 264/82; 264/83; 264/176.1; 264/183; 264/204; 264/211.14; 264/211.19; 501/95; 501/96; 423/291
[58] Field of Search ............ 501/49, 95, 96; 568/1, 568/4, 5.7; 556/403; 149/19.2, 19.3, 22, 121; 264/29.2, 29.1, 56, 60, 65, 82, 83, DIG. 19, 204, 183, 176.1, 29.6, 211.14, 211.19; 423/447.1, 447.5, 447.3, 447.7, 290, 291, 440

[56] References Cited

U.S. PATENT DOCUMENTS

| | | | |
|---|---|---|---|
| 2,925,440 | 2/1960 | Burg et al. | 260/606.5 |
| 3,025,326 | 3/1962 | Burg et al. | 260/606.5 |
| 3,035,949 | 5/1962 | Parshall | 149/22 |
| 3,071,552 | 1/1963 | Burg | 260/2 |
| 4,097,294 | 6/1978 | Rice et al. | 501/96 |
| 4,444,972 | 4/1984 | Allcock et al. | 568/4 |
| 4,550,151 | 10/1985 | Takamizawa et al. | 528/28 |
| 4,590,034 | 5/1986 | Hirano et al. | 501/96 |
| 4,604,367 | 8/1986 | Takamizawa et al. | 501/88 |
| 4,707,556 | 11/1987 | Paciorek et al. | 501/96 |

FOREIGN PATENT DOCUMENTS 912530 12/1962 United Kingdom.

OTHER PUBLICATIONS

"Polymers from Decaborane", *Polymer Letters*, vol. 2, 1964, pp. 987–989.
"Types of Polymer Combination among the Non-metallic Elements", by Anton B. Burg, *Chemical Society (London) Spec. Publ. No. 15*, 1961, pp. 17–31.

*Primary Examiner*—Jan H. Silbaugh
*Assistant Examiner*—Hubert C. Lorin
*Attorney, Agent, or Firm*—DePaoli & O'Brien

[57] ABSTRACT

Boron ceramics including boron ceramic fibers are formed by pyrolyzing at temperatures greater than 800° C. organoboron polymers which have been formed by condensing decaborane with amines or phosphines.

25 Claims, No Drawings

PROCESS FOR THE FORMATION OF BORON-CONTAINING CERAMICS FROM ORGANOBORON PRECERAMIC POLYMERS

This application is a Continuation-In-Part application of U.S. Ser. No. 933,413, filed Nov. 21, 1986, now abandoned.

FIELD OF THE INVENTION

The present invention is directed to the formation of boron-containing ceramics from organoboron preceramic polymers. The present invention is also directed to a novel method of forming boron-containing ceramics, in particular, ceramic fibers from decaborane-amine and decaborane-phosphine condensation polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organometallic polymers such as organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers and are subsequently converted to ceramic materials, in particular, silicon carbide/silicon nitride bearing fibers by a two-step process of curing to render the preceramic polymer fiber insoluble followed by a routine pyrolyzation schedule comprising heating the fiber up to about 1,200° C. whereupon the fiber is converted to the ceramic form.

Other metallic polymers have recently been suggested as ceramic precursers besides organosilicon polymers. Thus, U.S. Pat. No. 4,581,461 forms boron nitride by pyrolyzing B-triamino-N-tris (trialkylsilyl)-borazines. U.S. Pat. No. 4,097,294 suggests that a boron carbide ceramic is obtainable from a carborane carbon polymer.

The formation of aluminum nitride fibers is disclosed in commonly assigned, U.S. Pat. No. 4,687,657. Aluminum nitride ceramics are formed by thermal conversion of poly-N-alkyliminoalanes. Ceramics comprising silicon carbide and aluminum nitride solid solutions are also disclosed. These ceramic alloys are formed by thermal conversion of a mixture of an organosilicon preceramic polymer and the above-mentioned aluminum-containing polymer. Moreover, many recent patents describe specific silicon-containing preceramic polymers which are formed into silicon carbide and/or nitride upon thermal treatment.

Alternatively, ceramic fibers such as metal carbide fibers have been formed by incorporating inorganic metallic compounds into a carbon fiber product, the precarbonaceous polymer forming solution, the polymer spinning solution or the polymer fiber subsequent to spinning, and converting the metallic compounds in situ to metal carbides upon thermal conversion. In these methods, the precarbonaceous polymer acts as the source of carbon.

Important ceramics formed by such method are boron carbide and boron carbide-containing carbon fibers. The addition of boron carbide to carbon fiber is known to increase fiber strength and, more particularly, to substantially increase the thermo-oxidative stability of carbon fibers such that the boron carbide-containing carbon fibers can withstand higher temperature environments than carbon fibers. Methods of incorporating boron into carbon fibers to form boron carbide fibers have typically involved treating the carbon fibers with gaseous boron halides or impregnation with soluble borane salts or boric oxides including boric acid, metallic borates and organic borates, e.g. alkyl and aryl borates. Upon being treated with the boron compounds, the fibers are heated to initiate reaction of boron with the carbon fibers to yield boron carbide.

In commonly assigned, copending application U.S. Ser. No. 933,413, filed Nov. 21, 1986, now abandoned and continuation-in-part application U.S. Ser. No. 082,761, filed Aug. 7, 1987, boron-containing fibers are provided by forming a blend of a boron-containing polymer and a precarbonaceous polymer, shaping the blend into a fiber such as by spinning and pyrolyzing to form a boron ceramic fiber. Preferably, the boron-containing polymers are prepared by the condensation of boranes with Lewis bases. Such polymers are well known and prepared by condensing a borane such as diborane, pentaborane or decaborane with Lewis bases such as amines, amides, isocyanates, nitriles and phosphines. The borane-Lewis base condensation polymers are known and described, for example, in Polymer Letters, Vol. 2, pp. 987–989 (1964); Chemical Society (London) Spec. Publ. No. 15 (1961), "Types of Polymer Combination among the Non-metallic Elements", Anton B. Burg, pp. 17–31; U.S. Pat. Nos. 2,925,440; 3,025,326; 3,035,949; 3,071,552; and British Pat. No. 912,530. Other borane-containing polymers suggested include those disclosed in U.S. Pat. No. 3,441,389 wherein borane polymers are prepared by heating a compound of the formula $(RAH_3)_2 B_{10}H_{10}$ or $(RAH_3)_2 B_{12}H_{12}$ at a temperature of 200°–400° C. for several hours. Moreover, borazines such as disclosed in U.S. Pat No. 4,581,468 and carborane polymers such as suggested in U.S. Pat. No. 4,097,294 are also considered useful.

The use of organometallic polymers as precursors for ceramic materials is advantageous in the formation of ceramic fibers. It is considerably easier to spin the polymeric materials than precursors composed of inorganic metallic particles dispersed in a spinnable organic matrix. It would, therefore, be desirable to find new organometallic polymers and methods of making same which can be used as ceramic precursors. The present invention is concerned with preparing organoboron polymers which can serve as precursors for boron ceramics such as boron carbide and boron nitride and ultimately to the formation of fibers containing these boron-containing ceramic materials.

One difficulty in preparing boron-containing ceramics from organic precursers is the inability to incorporate sufficient boron into the organic polymer and react with the carbon components to form boron carbide, $B_4C$. Methods of incorporating boron-containing salts or boron-containing inorganic powders and the like into precarbonaceous polymer solutions, solids, or the formed carbon articles have proved unsuccessful in providing sufficient amounts of boron to yield improved boron carbide-containing ceramic materials. There is, therefore, a continuing need to find additional preceramic organoboron polymeric materials which yield ceramics containing increased levels of boron.

Although, as described above, decarborane-containing polymers such as those produced by the reaction of decaborane with a Lewis base such as an amine, amide, nitrile, etc. were prepared in the early 1960's and thought to be useful as high temperature stable polymers or even as high energy fuels, their use as a boron-containing ceramic precursor was not recognized. Accordingly, it is a primary object of the present invention to utilize the polymers produced by the condensation of a borane with a Lewis base as a boron-containing ceramic precursor.

SUMMARY OF THE INVENTION

In accordance with the present invention, polymers formed by the condensation of a borane with a primary amine, a polyamine or a phosphine are useful as ceramic precursors. The borane-containing condensation polymers are converted to the ceramic form by pyrolyzation at temperatures of at least about 800° C. in an inert atmosphere or a reactive atmosphere such as ammonia, phosphine, etc.

The borane-containing condensation polymers may be spun into fibers prior to pyrolyzation to yield a ceramic fiber once the polymeric fibers are pyrolyzed. Depending upon the pyrolyzation atmosphere which is utilized, boron-containing ceramic fibers such as boron carbide, boron nitride and boron phosphide fibers can be produced.

DETAILED DESCRIPTION OF THE INVENTION

The borane condensation polymers useful in the present invention are formed by known methods comprising the condensation polymerization of a borane with the specified Lewis bases of the present invention. Thus, such polymers are known and prepared by condensing the Lewis base with a borane such as diborane, pentaborane, decaborane, and substituted and di-substituted derivatives thereof including alkyl, cycloalkyl, aryl, and alkyl-aryl derivatives. Decaborane ($B_{10}H_{14}$) is the preferred boron source in view of the high boron content of the compound.

The borane-Lewis base condensation polymers including, borane-amine and borane-phosphine polymers are known and the methods of forming same are described, for example, in the aforementioned *Polymer Letters*, Vol. 2, pp. 987–989 (1964); Chemical Society (London) Spec. Publ. No. 15 (1961), "Types of Polymer Combination among the Non-metallic Elements", Anton B. Burg, pp. 17–31; U.S. Pat. Nos. 2,925,440; 3,025,326; 3,035,949; 3,071,552; and British Pat. No. 912,530, all of which are herein incorporated by reference.

The amines are selected from primary amines and polyamines either primary, secondary or tertiary. Useful primary amines have the structure of general formula: $R-NH_2$ wherein R is selected from $C_2-C_{10}$ alkyl, cycloalkyl or aryl. Non-limiting examples include ethylamine, n-propylamine, iso-propylamine, n-butylamine, sec-butylamine, tert-butylamine, n-octylamine, benzylamine, etc.

The polyamines useful as reactants have the general formula:

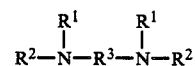

wherein $R^1$, $R^2$ and $R^3$ can be hydrogen, alkyl, cycloakalkyl, aryl or alkenyl. The nitrogen atoms may be included in a ring structure of $R^3$. Non-limiting examples of polyamines include ethylene diamine, tetramethylene diamine, diazobicyclo[2,2,2]octane, etc.

The useful phosphines and polyphosphines can be represented by the general formula:

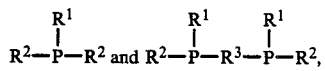

respectively wherein $R^1$, $R^2$, $R^3$ have the meanings hereinbefore defined for the polyamines. The reactants may also include amino phosphines of the general formula $R^1-NPR^2-R^3$, wherein the R groups are lower alkyl or are such as to constitute a ring including either N or P. Such materials are disclosed in the aforementioned U.S. Pat. No. 3,071,552.

The proportions of the amine or phosphine and the decaborane used in the process of this invention are not critical with equimolar amounts of the borane and Lewis base being typical. An excess of the Lewis base up to a 100% excess can be used.

The reaction between the borane and the amine or phosphine takes place at temperatures between about 0° and 225° C. The reaction pressure is not critical since the reaction takes place at subatmospheric pressure up to super-atmospheric pressures. Super-atmospheric pressures are particularly useful when volatile amines or phosphines are being employed. In such a case, pressures up to 35 atmospheres are useful.

The reaction can take place in the absence of any solvent. However, it is preferred to use an inert solvent such as an aromatic hydrocarbon, e.g., benzene, toluene, or xylene, or an aliphatic hydrocarbon in which decaborane is soluble, e.g., 2,2-dimethyl butane.

The reaction can be completed in from ½ to 1 hour with the liberation of hydrogen and the cessation of an increase in pressure being a convenient end point for the reaction. However, longer times from 1 to 2 days may be necessary to provide sufficient polymerization. Molecular weights of the borane-containing polymers will be relatively low, typically not exceeding 20,000, and more typically, ranging from about 400 to 5,000, and often between 400 and 2,000.

The present invention is particularly useful in the formation of boron ceramic fibers from a spinning composition comprising the organoboron preceramic polymer or a blend of boron-containing polymer and a precarbonaceous polymer. Polymer blends are particularly useful if the organoboron polymer has a low molecular weight. Any known technique for spinning the organoboron preceramic polymer into fiber may be used including melt and solvent spinning methods. While it may be possible to melt spin the organoboron polymer, most likely the organoboron polymer will have a melting point far above the melting point of a blendable precarbonaceous polymer which may be adversely effected at the temperatures required for melt spinning. Accordingly, a solvent spinning method is preferred. Thus, spinning into fibers is preferably accomplished with either the wet or dry spinning techniques. In dry spinning, the spinning composition issues from the spinning apparatus through a spinning column wherein a stream of drying gas is simultaneously fed through the spinning column. The temperature of the spinning column and that of the drying gas is dependent on the volatiles which have to be evaporated from the filament during its passage through the spinning column. In wet spinning, the spinning dope is extruded into a spin bath where coagulation of the spinning solution and the formation of the fiber occurs. A variety of suitable solvent-nonsolvent systems are known in the fiber art for use as the coagulating medium or spin bath.

Suitable spin baths are nonsolvents for the polymers contained in the spinning blend and do not chemically react with the spinning solution. The fiber which is formed is typically washed to remove any adhering traces of the spin bath, and then dried.

In most cases, the solvent diluent which is employed provides the spinning composition (i.e., a spinning dope) with a room temperature viscosity range between about 0.1-3,000 poises, and preferably between about 100-1,000 poises.

Any useful solvent can be employed. Nonlimiting solvents include those for use with a water-miscible polymer and which include water and/or water-miscible solvent such as methanol, ethanol, acetic acid, dimethylformamide, tetrahydrofuran, and the like. Solvents which can be used with an oil-soluble polymer include organic solvents such as benzene, hexane, dichloroethylene, dichloroethylene, dimethylacetamide, dibutylether, ethylacetate, and the like.

If polymer blends are to be spun, the boron-containing polymers must be soluble in the solvents used to dissolve the precarbonaceous polymer and form the spinning dope or at least be soluble in solvents compatible with the precarbonaceous polymer solvents. It is preferred that the solvent for the boron-containing polymer be the same as the solvent used to dissolve the precarbonaceous polymer. It is not absolutely necessary that the solvent for the boron-containing polymer and the precarbonaceous polymer be the same as long as the solvents are compatible. Compatibility as stated herein means the solvents will form a homogenous mixture.

The concentrations of the polymeric materials in the spinning solution can vary widely and will depend for one on the particular spinning process, e.g., dry or wet which is used to form the fibers. The concentration of the boron-containing polymer is the controlling factor in solubility and, thus, for greater amounts of boron-containing polymer required, the solution will have to be less concentrated. Typically, for wet spinning, concentrations of the polymeric materials between about 5 and 20% by weight will be used whereas for dry spinning, concentrations of up to about 80% are useful. It is extremely difficult to obtain boron-containing polymer concentrations near 80% and, thus, for dry spinning, a much higher level of the precarbonaceous polymer relative to the boron-containing polymer must be utilized. In such instances, the boron content of the formed fibers will be relatively low and, thus, dry spinning is not a preferred method of forming boron carbide fibers wherein the amount of boron relative to carbon must approach 3:1. On the other hand, the dry spinning process may be useful in forming boron nitride, boron phosphide or boron metalloid ceramic fibers inasmuch as the amount of boron-containing polymer needed is the minimum to form an intact fiber. High levels of the precarbonaceous polymer do not adversely effect the non-carbide ceramic products since the polymer is burned away and is not present as a carbon source. The amount of the precarbonaceous polymer therefore need not be controlled as in the case of the boron carbide fibers. Preferably, wet spinning is used to form the fibers since the greater amounts of solvent allow the use of a greater amount of organoboron polymer.

After a newly formed fiber is spun, it can be stretched or drawn to about 100-300% of its original length by conventional techniques.

The preceramic polymeric fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively various fibrous configurations may be formed form the inorganic fibers at the conclusion of the pyrolysis step of the process.

To provide a final ceramic fiber product with optimal physical properties, it is preferred to subject the preceramic polymeric fiber from the preceramic fiber formation step to an initial thermal treatment in a molecular oxygen environment. The polymers in the preceramic fiber are partially carbonized to a stabilized form so that the subsequent pyrolysis step of the process can be effected without the concomitant destruction of the fibrous configuration. The thermal treatment step can be conducted by heating the fiber in a molecular oxygen-containing atmosphere at a temperature ranging between about 200°-600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymers. Typically a 15-50% reduction in the weight of the fiber occurs during the thermal treatment step. It is believed that a crosslinking of carbon atoms occurs during the thermal treatment to produce a charred structure.

The thermal treatment can be performed in an auto clave by heating to the required temperature/time schedule. A continuous thermal treatment can be accomplished by the continuous passage of a fiber through a heated chamber or calcining furnace. The fibrous structure of the fiber is retained throughout the thermal treatment step. There is a tendency for the fiber to shrink while undergoing thermal treatment.

Alternatively, the preceramic fibers can be subjected to a chemical stabilization treatment before being subjected to the pyrolysis step. In a typical stabilization procedure, the dried fibers are contacted with a reactive free radical-forming agent such as dizidoformamide, which effects the desired crosslinked structure in the fiber substrate at ambient temperatures (e.g., 10°–40° C.).

In the subsequent pyrolysis step of the process, the preceramic fiber (either charred or uncharred) is subjected to a temperature between about 800°–2,500° C. (preferably about 1,100°–1,800° C.). The pyrolysis period normally will range between about 0.2–8 hours. Any pyrolysis gas can be utilized to pyrolyze the fibers. Thus, inert gases will lead to the formation of metal carbides while reactive gases including ammonia, phosphine, and metalloid-containing gases such as metal hydrides including germane, arsine, stibine, silane, etc. will lead to boron nitride, boron phosphide, and boron-metallic ceramics, respectively. Thus, if a carbide is desired, the pyrolyzation gas will be inert and the precarbonaceous polymer if used will be one that does not easily burn away so as to form a carbon structure which can be used for reaction. On the other hand, if the ceramic alloy is to be formed from reaction of the boron polymer and the pyrolyzing atmosphere, it may be desirable to use as the blended precarbonaceous polymer one which burns off relatively easy.

The following examples are intended to illustrate the invention only and are not to be construed as limiting the invention to the embodiments shown.

EXAMPLE 1

Reaction of Decaborane with Bis(diethylphosphino)ethane 7.00g $B_{10}H_{14}$ (57.3 mmol) was dissolved in 100 ml benzene. An equimolar amount of the diphosphine $Et_2PCH_2CH_2PEt_2$, TEEDP, (d=0.855 g/ml) was added by slow dripping over the course of 1/2 hour. A pale yellow develops with the addition of TEEDP along with steady hydrogen evolution. After the diphosphine has been added and stirred overnight, a fine white powder results. One equivalent of hydrogen is given off. The white product is soluble in acetone and its analysis is featured in Table 1. If the reaction is run in acetone the product stays in solution after stirring overnight and exhibits little noticeable difference with that from the benzene (or toluene) reaction.

EXAMPLE 2

Reaction of Decaborane with Ethylenediamine

Similar reactions to that in Example 1 are carried out with diamines. To a solution of 3.00 g $B_{10}H_{14}$ (24.5 mmol) in 50 ml toluene was added by slow dripping a solution of 1.64 ml $H_2NCH_2CH_2NH_2$, en, (24.5 mmol) in 50 ml toluene. The decaborane solution turned milky white followed by precipitation of a tacky yellow solid. No gas was evolved during this reaction. At the end of the addition the toluene was milky white with the clumpy yellow-white solid unchanged. Setting the mix to reflux overnight resulted in slightly more than one equivalent of gas evolved and a less tacky yellow-white precipitate. The solvent was filtered and discarded and the filtrant was washed with hexane and dried to a fine off-white powder (~100% yield). This solid can be fractionated into three portions (1:1:1.5) characterized as insoluble (m.p. 290° C., dec.), acetone soluble (m.p. 130° C.), and THF soluble (m.p. 95° C.). Analysis is featured in Table 1.

EXAMPLE 3

Reaction of Decaborane with Tetramethylenediamine

To 3.00 g $B_{10}H_{14}$ (24.5 mmol) in 50 ml toluene, 3.70 ml of $Me_2NCH_2CH_2NMe_2$, TMEDA, (24.5 mmol) was added again with slow dripping. The reaction was similar to that with ethylenediamine with a clumpy white precipitate resulting. After reflux for 16 hours only 75% of the expected one equivalent of gas had evolved so reflux was continued for a total of 6 days with only 0.9 equivalents evolved. The solid precipitate was collected, washed, and dried (~85% yield).

EXAMPLE 4

Reaction of Decaborane with Diazobicyclo[2.2.2]octane

The reaction of decaborane with $HN(CH_2CH_2)_4NH$, DABCO, was carried out analogously as for en and TMEDA. The gas evolution rate was intermediate of that for the other diamines, and product yield, as a yellow-white powder, was 95%.

EXAMPLE 5

Reaction of Decaborane with Monoalkylamines

Several amines were condensed with decaborane and their analyses are summarized in Table 1. Details of the reaction with n-butylamine is described.

Three grams of $B_{10}H_{14}$ (24.5 mmol) were dissolved in 100 ml of toluene. As 2.43 ml $Bu^nNH_2$ (24.5 mmol) was added the solution turned yellow and no gas was evolved until reflux was started. After 41 hours of heating a yellow-white precipitate formed and 1.75 equivalents of gas wire given off. Alternatively, the yellow-white precipitate resulting from a shorter reflux of 16 hours was collected and heated in an inert atmosphere to 200° C. (temperature profile: ramp rate 6° C./min; hold at 200° C. ~2½hrs.). In this case 2 equivalents of gas were evolved after 3 hours. The product was an amber resin soluble in acetone.

EXAMPLE 6

Pyrolysis of primary amines

The same pyrolysis procedure was used for every example. Polymer sample was placed in an alumina boat and then placed inside a mullite furnace tube. The tube was fitted with ground glass ends which allowed the contents to be purged with a desired gas and constantly monitored with a thermocouple. All pyrolyses were carried out under a dynamic gas flow (100 cc/min). The temperature schedule was not optimized but was chosen to insure complete ceramic conversion. The sample was first brought from room temperature to 200° C. (6° C./min) and held for 1 hour. Under the flowing conditions of this procedure, this treatment removed any solvent and thoroughly purged the polymer sample before any thermolytic chemistry took place. The furnace was then ramped to 1100° C. (5° C./min) and held for 2 hours before cooling overnight. Table 2 sets forth the analyses of pyrolyzing borane-primary amine condensation polymers in argon according to the above-described procedure.

TABLE 1

| Elemental Analysis for Decaborane-Lewis Base Polymers | | | | |
|---|---|---|---|---|
| C | H | B | N | Total |
| $[B_{10}H_{12}\cdot NPr^nH]_n$ 16.32 | 9.72 | 35.88* | 5.52 | 67.44 |

TABLE 1-continued
Elemental Analysis for Decaborane-Lewis Base Polymers

|  | C | H | B | N | Total |
|---|---|---|---|---|---|
|  | (20.2) | (11.3) | (60.6) | (7.9) | [32.56] |
| $[B_{10}H_{12}\cdot NPr^iH]_n$ | 17.47 | 9.52 | 47.16* | 6.30 | 80.45 |
|  | (20.2) | (11.3) | (60.6) | (7.9) | [19.55] |
| $[B_{10}H_{12}\cdot NBu^nH]_n$ | 21.30 | 10.13 | 46.38* | 5.86 | 83.67 |
|  | (25.0) | (11.5) | (56.2) | (7.3) | [16.33] |
| $[B_{10}H_{12}\cdot NBu^nH]_n$ | 29.72 | 10.77 | 50.89 | 7.31 | 98.69 |
|  | (25.0) | (11.5) | (56.2) | (7.3) | [1.31] |
| $[B_{10}H_{12}\cdot NBu^{sec}H]_n$ | 17.35 | 9.80 | 47.23* | 4.32 | 78.70 |
|  | (25.0) | (11.5) | (56.2) | (7.3) | [21.30] |
| $[B_{10}H_{12}\cdot NBu^tH]_n$ | 23.45 | 10.40 | 47.24* | 6.53 | 87.62 |
|  | (25.0) | (11.5) | (56.2) | (7.3) | [12.38] |
| $[B_{10}H_{12}\cdot NOct^nH]_n$ | 28.18 | 11.39 | 40.98* | 3.33 | 83.88 |
|  | (38.7) | (12.2) | (43.5) | (5.6) | [16.12] |
| $[B_{10}H_{12}\cdot en]_n$ | 17.14 | 10.53 | 56.68 | 15.73 | 100.08 |
|  | (13.3) | (11.2) | (60.0) | (15.5) | [—] |
| $(B_{10}H_{12}\cdot TMEDA)_n$ | 33.56 | N.A. | 35 | 11.50 | N.A. |
|  | (30.5) | (12.0) | (45.7) | (11.8) |  |
| $(B_{10}H_{12}\cdot DABCO)_n$ | 32.38 | 9.13 | 37.40 | 10.25 | 89.16 |
|  | (31.0) | (10.4) | (46.5) | (12.1) | [10.8] |
| $(B_{10}H_{12}\cdot TEEDP)_n$ | 36.19 | 10.48 | 32.57 | 18.58# | 97.82 |
|  | (36.8) | (11.1) | (33.1) | (19.0) | [2.18] |

Theoretical values in parenthesis
Difference from 100% mass balance in brackets
All boron analyses were done by carbonate fusion at 900° C. followed by ICP
*Signifies wide variations among multiple analyses (>2%)
phosphorus analysis
en = ethylenediamine; TMEDA = tetramethylenediamine; DABCO = diazobicyclo[2.2.2]octane; TEEDP = tetraethylethylenediphosphine

TABLE 2
Elemental Analysis for Pyrolysis Chars for Preceramic Polymers

| Polymer Precursor | B % | Other |
|---|---|---|
| $[B_{10}H_{12}\cdot NPr^nH]_n$ | 47.16 | 11.45% C; N low |
| $[B_{10}H_{12}\cdot NBu^nH]_n$ | 46.88 |  |
| $[B_{10}H_{12}\cdot NBu^{sec}H]_n$ | 47.27 |  |
| $[B_{10}H_{12}\cdot NBu^tH]_n$ | 48.76 |  |
| $[B_{10}H_{12}\cdot NOct^nH]_n$ | 41.00 |  |

What is claimed is:

1. A method of forming a boron ceramic of increased boron content comprising: pyrolyzing at a temperature of at least about 800° C. an organoboron preceramic polymer consisting essentially of the condensation product of decaborane with a Lewis base selected from the group consisting of amines and phosphines.

2. The method of claim 1 wherein said Lewis base is a primary monoamine of the general formula: R—NH$_2$ wherein R is C$_2$-C$_{10}$ alkyl, cycloalkyl or aryl.

3. The method of claim 2 wherein said amine is a primary C$_2$-C$_{10}$ alkyl amine.

4. The method of claim 1 wherein said Lewis base is a polyamine of the general formula:

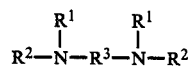

wherein R$^1$, R$^2$ and R$^3$ are hydrogen, alkyl, cycloalkyl, aryl or alkenyl.

5. The method of claim 1 wherein said Lewis base is a phosphine of the general formula:

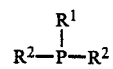

wherein R$^1$ and R$^2$ are hydrogen, alkyl, cycloalkyl, aryl or alkenyl.

6. The method of claim 1 wherein said Lewis base is a polyphosphine of the general formula:

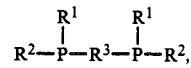

wherein R$^1$, R$^2$, R$^3$ are hydrogen, alkyl, cycloalkyl, aryl or alkenyl.

7. The method of claim 1 wherein said pyrolyzation is conducted in an atmosphere of an inert gas and said boron ceramic comprises boron carbide.

8. The method of claim 1 wherein said pyrolyzation is conducted in a gas reactive with boron to form a ceramic comprising the reaction product of boron and said reactive gas.

9. The method of claim 8 wherein said reactive gas comprises nitrogen and said boron ceramic comprises boron nitride.

10. The method of claim 9 wherein said reactive gas comprises ammonia.

11. The method of claim 8 wherein said reactive gas comprises phosphorous and the boron ceramic comprises boron phosphide.

12. The method of claim 11 wherein said reactive gas comprises phosphine.

13. A method of forming boron ceramic fibers of increased boron content comprising: spinning an organoboron preceramic polymer consisting essentially of the condensation product of decaborane with a Lewis base selected from the group consisting of amines and phosphines to form a preceramic fiber and pyrolyzing said preceramic fiber at a temperature of at least about 800° C. to convert said preceramic fiber to a boron ceramic fiber.

14. The method of claim 13 wherein said Lewis base is a primary monoamine of the general formula: R—NH$_2$ wherein R is C$_2$-C$_{10}$ alkyl, cycloalkyl or aryl.

15. The method of claim 14 wherein said amine is a primary C$_2$-C$_{10}$ alkyl amine.

16. The method of claim 13 wherein said Lewis base is a polyamine of the general formula:

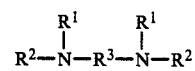

wherein R$^1$, R$^2$ and R$^3$ are hydrogen, alkyl, cycloalkyl, aryl or alkenyl.

17. The method of claim 12 wherein said phosphine has the general formula:

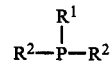

wherein R$^1$ and R$^2$ are hydrogen, alkyl, cycloalkyl, aryl or alkenyl.

18. The method of claim 13 wherein said Lewis base is a polyphosphine of the general formula:

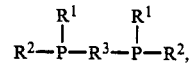

wherein R$^1$, R$^2$, R$^3$ are hydrogen, alkyl, cycloalkyl, aryl or alkenyl.

19. The method of claim 13 wherein said spinning comprises dry or wet spinning.

20. The method of claim 13 wherein said pyrolyzation is conducted in an atmosphere of an inert gas and said boron ceramic comprises boron carbide.

21. The method of claim 13 wherein said pyrolyzation is conducted in a gas reactive with boron to form a ceramic comprising the reaction product of boron and said reactive gas.

22. The method of claim 21 wherein said reactive gas comprises nitrogen and said boron ceramic comprises boron nitride.

23. The method of claim 22 wherein said reactive gas comprises ammonia.

24. The method of claim 21 wherein said reactive gas comprises phosphorus and the boron ceramic comprises boron phosphide.

25. The method of claim 24 wherein said reactive gas comprises phosphine.

* * * * *